June 8, 1965     L. A. MOE     3,188,538
REACTANCE TEST CELL
Filed April 1, 1960
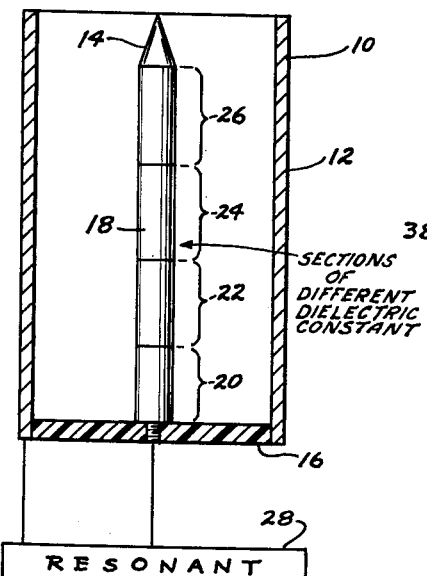
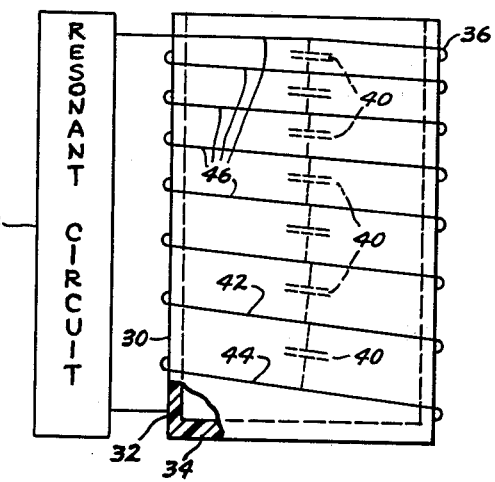
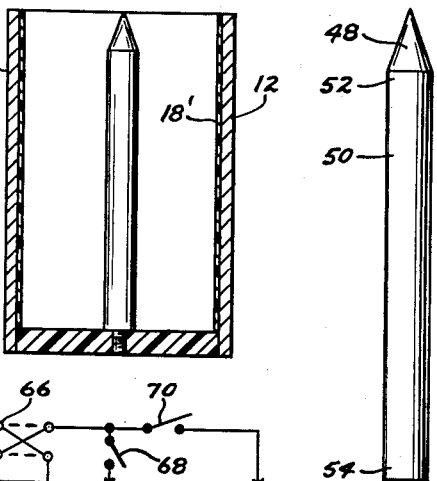
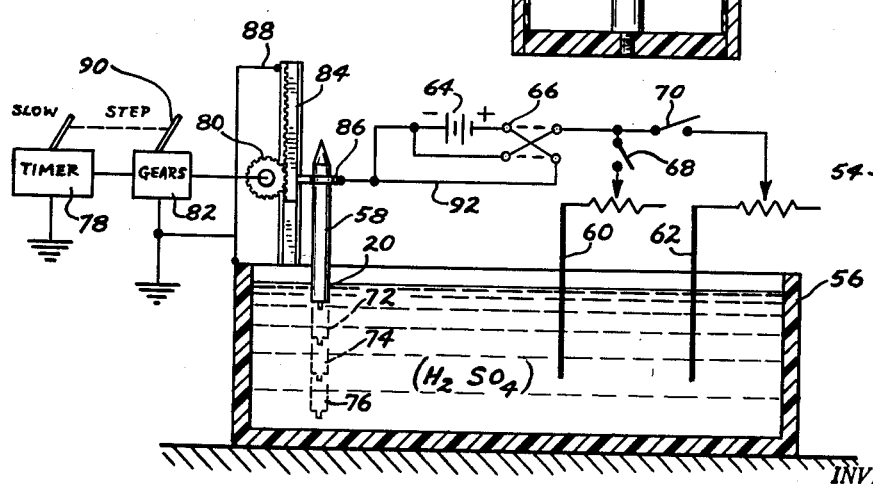
INVENTOR.
LOWELL A. MOE
BY Coulsen & Nagle
ATTORNEYS United States Patent Office 3,188,538
Patented June 8, 1965

3,188,538
REACTANCE TEST CELL
Lowell A. Moe, Minneapolis, Minn., assignor to F. H. Peavey & Company, Minneapolis, Minn., a corporation of Minnesota
Filed Apr. 1, 1960, Ser. No. 19,303
11 Claims. (Cl. 317—246)

This invention relates to test cells for measuring the dielectric properties of granular and powdered bulk materials which are subject to packing when inserted into a test cell. Further, there is provided a test cell and method of making same wherein material density variations may be electrically compensated for.

Some reactance test cells have compensated for packing by providing a greater physical spacing between test cell capacitance forming electrodes at the bottom than at the top of the cell. For example, a center electrode of a coaxial pair of electrodes has been tapered with the smaller diameter being at the cell bottom. Since for consistent results from various test cells the taper and the diameter dimension must be accurate expensive machining operations are required to provide a good quality test cell.

The present invention eliminates the tapering of the cell electrodes and still provides compensation for varied material density, such as caused by packing, by introducing an additional distributed reactance means into the test cell which is varied during fabrication to compensate for the expected density variations. In one version of the invention an electroplated dielectric coating is formed on one of two cell electrodes with the dielectric constant of the coating being varied during deposition to provide a varied distributed capacitance in the cell. In another version a dielectric cup is used as a test cell with a coil associated therewith and wound to have less electrical reactance in the cup portion in which greater density is expected than in the other cup portions.

It is an object of this invention to provide a reactance test cell in which the distributed reactance of the cell is varied by electrical means formed during cell fabrication to compensate for expected material density variations of material to be tested.

It is another object to provide an electrical reactance test cell in which the distributed reactance thereof is varied by insulation having a varied dielectric constant.

It is a further object to provide an electrical reactance test cell having a distributed inductive-capacitive reactance-sensing element.

It is a still further object to provide an electrical reactance test cell having a peripheral reactance sensing element with a varied distributed reactance to compensate for expected density variations in materials to be tested.

It is another object to provide an electrical reactance test cell having an electrical coil sensing element arranged to provide a varied distributed reactance for expected material density variations.

These and other more detailed and specific objects will be disclosed in the course of the following specification, reference being had to the accompanying drawings, in which—

FIG. 1 illustrates in a vertical sectional view a preferred embodiment of the present invention.

FIG. 2 illustrates in an elevational view a second embodiment of the present invention which provides a test cell without a center electrode.

FIG. 3 is a modification of the FIG. 1 embodiment.

FIG. 4 is an elevational view of a test cell center electrode having a diagrammatically illustrated distributed capacitance variation along its length.

FIG. 5 is diagrammatic illustration of apparatus for forming a dielectric coating having a varied dielectric constant.

Referring now more particularly to FIG. 1, there is shown a test cell 10 consisting of an outer tubular shell 12 of aluminum and joined to the spaced-apart axially-extending center post 14 by the insulated bottom 16. The post and shell respectively form inner and outer cell sides. The cell capacitance between the aluminum shell 12 and the center post 14 is varied along the cell axis by providing an aluminum oxide coating 18 of varying dielectric constant on the post 14 surface. The post 14 arbitrarily is divided into 4 axial sections 20, 22, 24 and 26, each of which has a dielectric constant different from the other three sections. The formation of the four sections with a different dielectric constant and the same radial thickness will be later fully described.

The test cell 10 is electrically connected to a resonant circuit 28 to form a portion of the electrical capacitance therein. By inserting material having an ingredient with dielectric properties between the center post 14 and shell 12, the cell 10 capicitance is varied to alter the circuit 28 tuning for indicating the amount of the dielectric ingredient. When such materials are subject to packing, such as granular or powdered materials, there is provided a greater change in cell capacitance adjacent the axial section 20 at the cell bottom than adjacent the other sections. To provide a more constant value of distributed capacitance from the cell bottom 16 upward along the cell axis, the dielectric constant of the axial portions 20, 22, 24 and 26 are respectively increased in that order. This provides by the electrical means constituting the coating 18, a smaller value of distributed cell capacitance between the post 14 section 20 and the shell 12 than between the other post sections and the shell.

The compacted material near the cell bottom provides as increased amount of dielectric ingredient than what is provided near the top of the cell. The dielectric coating 28 is in effect in series electric field relation to the material and by providing a dielectric constant which varies inversely to the material density the distributed capacitance of the cell when loaded for a test tends to be constant along the cell axial length. This permits more accurate dielectric measurements to be performed on the material under test.

Referring now to FIG. 2, a second version of the present invention is illustrated which consists of a cup 30 of good quality dielectric material and having cylindrical sides 32 and a flat bottom 34 with an electrical coil 36 disposed around or embedded within the sides 32. A resonant circuit 38 is connected to the coil 36 such that the coil forms a part of the circuit 38 tuning portion. By inserting material having either dielectric or inductive properties into the cup 30, the reactance of the coil 36 is modified to alter the circuit 38 tuning for indicating the value of the material dielectric or inductive property. Note that this test cell does not have a center electrode.

When testing materials for their dielectric properties the coil distributed capacitance 40 is varied by the material to alter the circuit 38 tuning. Compensation for packing of granular or powdered material in the cup 30 is provided through the electrical coil means by increasing the axially spacing between adjacent coil turns for decreasing the distributed capacitance thereof at the bottom of the cup. When there is provided a single radial layer of coil turns it is preferred that the bottom two turns 42 and 44 have a much wider axial spacing than the upper turns 46. It has been found that this arrangement provides the most consistent results. Alternatively, of course, the coil 36 may have several radial layers with the turns adjacent the cup bottom 34 being interwound to reduce the coil distributed capacitance as is well known by experienced coil winders. In such a case the coil inductance will be a dominant electrical value such as could be used for measuring the inductive properties of metallic ores and the like.

The combined inductance and distributed capacitance of the coil 36 together with the circuit 38 provide a reactive impedance which varies with the frequency of the circuit. Insertion of material will, in effect, shift the reactive impedance characteristic to a higher or lower frequency. For a constant frequency in the circuit 38, this has the effect of changing the circuit impedance which may be used to amplitude modulate the single frequency for providing an indication of the material reactive properties.

FIG. 3 illustrates an alternate embodiment of the FIG. 1 capacitive reactance test cell 10 wherein a dielectric coating 18' is deposited on the inner surface of the conductive shell 12. As in FIG. 1 the coating 18' radial thickness is constant axially along the cell and may provide a varied distributed capacitance as explained for FIG. 1. The preferred manner of forming the coating 18' is electro-plating aluminum oxide on the shell 12.

FIG. 4 illustrates a center post 48 having an insulating coating 50 wherein the dielectric constant is continuously decreased from the post upper end 52 to the lower end 54 as indicated by the variable cross-hatching. This post may be used when the material packing is proportioned to the test cell depth and the measurements of the material reactive properties must be extremely accurate.

Referring now to FIG. 5 there is shown an electro-plating apparatus which provides a suitable environment for electro-depositing the dielectric coatings 18 and 18'. A suitable ceramic tank 56 contains an electrolyte, such as a 15% sulphuric acid bath, in which the center post anode 58 and the cathodes 60 and 62 are immersed. Variable battery source 64 is connected between the anode 58 and the two cathodes by the reversing switch 66 and the cathode switches 68 and 70.

The plating process is started with the anode 58 in the illustrated position by closing the switch 68 for electro-depositing a metal contaminant, such as metallic arsenic on the lower portion 20 of the anode. Five minutes later the anode 58 is lowered further into the bath as indicated by the dotted line 72, five minutes later it is again lowered to the position indicated by the dotted line 74, and finally in another five minutes the anode is again lowered to the position indicated by the dotted line 76. When the anode 58 reaches its lowest position, as indicated by the line 76, the switch 68 is opened for preventing further deposition of the arsenic while the switch 70 is closed to complete an electrical circuit through the zinc cathode 62. The switch 70 remains closed until the desired thickness of aluminum oxide has been formed on the anode 58. In forming the aluminum oxide it has been found that the arsenic will permeate the coating for lowering the dielectric constant in proportion to the amount of arsenic which was deposited on the anode. Therefore, it is seen that the lower portion 20 having the greatest amount of deposited arsenic will also have the lowest dielectric constant and distributed capacitance.

To form the four axial portions 20, 22, 24, and 26 of the coating 18, a timer motor 78 drives the pinion 80 through the speed reducing gears 82 for moving the toothed rack 84 downwardly a predetermined amount every five minutes. The anode 58 is held by the bracket 86 which is mounted on and insulated from the rack 84. A slide channel 88 mounted on the tank 56 rotatably supports the pinion gear 80 and slidably supports the rack 84. The ganged control levers 90, respectively on the timer 78 and the speed reduction gears 82, are for selecting the manner in which the anode 58 is immersed into the sulphuric bath with the levers in the illustrated position, the above described plating operation is performed, that is the timer rapidly drives the gears in five minute intervals. By moving the levers to the left, as viewed in FIG. 5, the timer 78 continuously drives the gears 82 at an extremely slow rate for immersing the anode 58 in a continuous manner for forming a dielectric coating which has a continuously variable dielectric constant along the anode axis, such as the coating 50 of FIG. 4. In either case the rate of anode immersion may be hand controlled.

The reversing switch 66 is provided to test the thickness and quality of the anodized coating on the anode 58. It is known that aluminum oxide having a metal contaminant has electrical rectifying properties and by reversing the polarity of the voltage applied between the anode 58 and cathode 62 the semi-conductor and dielectric properties can be determined by noting the respective current amplitudes flowing in the line 92. In this manner the coatings 18 and 18' can be very closely controlled as to their dielectric constant.

Experimentation has shown that most electrically conductive and semi-conductive metals listed in Group I through VIII of the Periodic Table of Atomic Weights will lower the dielectric constant of aluminum oxide. It is understood that other electrically insulating oxides may also be used to provide the dielectric coating. In one embodiment the contaminant was plated to be 1% of the oxide coating in the section 20 with the other sections having a smaller amount of contaminant. A contaminant percentage greater than 1% tends to decrease the insulating properties of the dielectric metallic oxide ruining the cell accuracy.

Another manner of providing a varied distributed capacitance along the cell axial length is to provide varying thicknesses of oxide coating. By using the apparatus of FIG. 5 and with the anode 58 inverted with respect to the illustrated position and only the switch 70 closed the upper portion of the anode has the thickest oxide coating, and therefore, the greatest distributed capacitance. Since the dielectric quality of the oxide is much better than that of free space an apparently insignificant change in coating 28 thickness provides electrical compensation for material packing. For example, in a coaxial test cell five inches long and three inches in diameter a thickness variation of the coating 28 of less than 0.001 inch fully compensated for packing. It may be noted that this small variation in coating thickness is negligible with respect to providing any effect on the cell distributed capacitance; the variation in cell capacitance being provided by the variation in the insulating properties of the coating itself.

After the anode 58 has been plated by one of the two above-described processes it is screwed into the cell bottom 16 as shown in FIG. 1 to form the center electrode 14.

It is understood that suitable modifications may be made in the structure as disclosed, provided such modifications come within the spirit and scope of the appended claims. Having now therefore fully illustrated and described by invention, what I claim to be new and desire to protect by Letters Patent is:

1. In a material receiving and holding capacitance type tubular electric test cell wherein the material is subject to packing axially along the cell, a pair of spaced apart tubular electrodes, capacitance forming means extending axially therebetween, said means including a tubular layer comprised of dielectric material and impurity means axially disposed in predetermined quantity therewith so as to provide an axial variable dielectric quality for said layer whereby the distributed capacitance of the layer is varied from one end to the other end of said capacitance forming means.

2. In an electric test cell of the capacitance type, a center capacitance electrode formed of a round bar, and an insulating metallic oxide coating thereon having a metal contaminate in amounts increasing toward one bar end along the bar length whereby the distributed capacitance of the coating is less at one end than the other end.

3. In an electric test cell, two spaced-apart electrodes forming a capacitance therebetween, one electrode having an insulating matallic oxide coating facing the other electrode for increasing said capacitance, and a metallic impurity in the coating for decreasing the dielectric qualities thereof whereby the capacitance has different distributed values between predetermined areas on the electrodes.

4. Apparatus as in the claim 3 wherein the metallic impurity is formed in four different zones such that the distributed capacitance is different in the respective zones.

5. Apparatus as in the claim 3 wherein the metallic impurity is continuously varied from one electrode end to its other end.

6. In an electric test cell, spaced-apart co-axial capacitance-forming electrodes, a dielectric metallic oxide coating of uniform thickness and being on one electrode facing the other electrode, and impurity means integrally formed with the oxide coating for decreasing the dielectric quality thereof whereby the distributed capacitance between the electrodes is varied from one to the other cell axial end.

7. In an electric test cell, a hollow container comprised of dielectric material to receive and hold material subject to packing adjacent one end, a helical coil mounted on the container and having its turns spaced further apart toward one coil end than the opposite end such that the distributed capacitance of the coil is greater at said other end whereby the material packing is electrically compensated for by said further spaced apart turns.

8. In a material receiving and holding electric test cell, a dielectric coil-form cup having a bottom, and wire disposed on the coil form and forming a variable helix having greater axial spacing between the wire turns at the cup bottom than the top.

9. Apparatus as in the claim 8 wherein the bottom two turns of the wire helix are spaced substantially further apart than the other turns.

10. In a tubular electric test cell, two coaxial spaced apart capacitance forming electrodes and a closed end to receive and hold a test specimen, an insulating layer of substantially constant thickness on one electrode facing the other electrode, said layer being comprised of an anodized oxide insulating material and insulating property changing material disposed therein in predetermined amount and location to vary the insulating properties thereof axially of said layer.

11. An electric test cell of the class above described comprising in combination; a center electrode including a terminal therefor and having a substantial axial length and constant cross section; a concentrically positioned electrode including a terminal therefor and being of like cross sectional configuration and axial length; and dielectric means intermediate said electrodes, said dielectric means being of like cross sectional configuration, axial length and including impurity means integrally formed with said dielectric means, said impurity means being disposed in predetermined amount and axial location whereby predetermined variations in dielectric constant of a granular material intermediate said electrodes are compensated so that the capacitance between the electrodes of the test cell is distributed along the axial length thereof.

References Cited by the Examiner

UNITED STATES PATENTS

| | | | |
|---|---|---|---|
| Re. 18,833 | 5/33 | Clark | 317—258 |
| 2,266,114 | 12/41 | Bartlett | 317—246 |
| 2,467,734 | 4/49 | Essig | 317—242 |
| 2,639,315 | 5/53 | Gutterman | 317—249 |
| 2,693,575 | 11/54 | Greenwood | 317—246 |
| 2,741,124 | 4/56 | Meyers | 317—246 |
| 2,794,940 | 6/57 | Roup | 317—242 |

FOREIGN PATENTS 628,499   4/36   Germany.

LARAMIE E. ASKIN, *Primary Examiner.*

SAMUEL BERNSTEIN, WALTER L. CARLSON, JOHN F. BURNS, *Examiners.*